(12) United States Patent
Wang et al.

(10) Patent No.: US 11,171,747 B1
(45) Date of Patent: Nov. 9, 2021

(54) SYSTEMS AND METHODS FOR MEASURING WIRELESS UPLINK SIGNAL QUALITY

(71) Applicant: PCTEL, Inc., Bloomingdale, IL (US)

(72) Inventors: Gang Wang, Germantown, MD (US); Wei Zha, Boyds, MD (US)

(73) Assignee: PCTEL, Inc., Bloomingdale, IL (US)

( * ) Notice: Subject to any disclaimer, the term of this patent is extended or adjusted under 35 U.S.C. 154(b) by 0 days.

(21) Appl. No.: 17/077,144

(22) Filed: Oct. 22, 2020

(51) Int. Cl.
*H04L 1/20* (2006.01)
*H04L 25/03* (2006.01)

(52) U.S. Cl.
CPC .............. *H04L 1/206* (2013.01); *H04L 1/203* (2013.01); *H04L 25/03006* (2013.01); *H04L 2025/03407* (2013.01)

(58) Field of Classification Search
None
See application file for complete search history.

(56) References Cited

U.S. PATENT DOCUMENTS

2011/0267938 A1* 11/2011 Conrad ............. H04L 25/03292
370/216
2019/0007852 A1* 1/2019 Kikuzuki ................ H04L 41/22
2020/0287640 A1 9/2020 Wang et al.

OTHER PUBLICATIONS

TAIT Communications, "Introduction to P25", Oct. 2015, p. 21-38 (Year: 2015).*
EPIQ Solutions, Documentation—Here's where to find the information you need to get started with your Epiq product, https://epiqsolutions.com/docs/, Copyright 2020.

* cited by examiner

*Primary Examiner* — Alpus Hsu
*Assistant Examiner* — Camquyen Thai
(74) *Attorney, Agent, or Firm* — Husch Blackwell LLP

(57) ABSTRACT

Systems and methods for measuring wireless uplink signal quality of a P25 H-CPM uplink waveform are provided. In particular, such systems and methods can include calculating an SINR measurement and/or an FBER measurement for the P25 H-CPM uplink waveform to determine whether P25 user equipment has been successfully deployed.

20 Claims, 5 Drawing Sheets

SYSTEMS AND METHODS FOR MEASURING WIRELESS UPLINK SIGNAL QUALITY

FIELD

The present invention relates generally to wireless communication. More particularly, the present invention relates to systems and methods for measuring wireless uplink signal quality.

BACKGROUND

Project 25 (P25) is a suite of standards for digital mobile radio communication designed for use by public safety organizations in North America, and Phase 2 of P25 uses Harmonized-Continuous Phase Modulation (H-CPM) in wireless uplink signal transmissions. H-CPM is a quaternary modulation with a quaternary alphabet of M=4 to represent every 2 information bits input. A H-CPM signal is transmitted at 6000 symbols/sec, modulation applies to an entire frame, including pilots and traffic, and a modulated waveform of the H-CPM signal has a constant envelop.

However, as is known in the art, H-CPM is distinguished from normal CPM by defined, specific modulation parameters, including a modulation index h and a phase pulse filter response length in information bits (i.e. symbols) L. Advantageously, H-CPM provides flexibility and high spectrum efficiency, but complicates design when calculating a signal-to-interference-plus-noise ratio (SINR) measurement and a frame-bit-error-rate (FBER) measurement due to a modulation inherited inter-symbol interference.

Conventional systems and methods have difficultly accurately calculating SINR and FBER measurements for P25 H-CPM signals. In particular, the SINR measurement can be difficult to calculate because conventional systems and methods calculate the SINR measurement based on an out-of-band noise power measurement and an in-band signal power measurement. Furthermore, conventional systems and methods do not measure FBER for P25 H-CPM signals. Instead, conventional systems and methods rely on less accurate, slower, and/or resource intensive methods, such as a zero-forcing equalizer, a minimum square error equalizer, and/or a maximum likelihood sequence equalizer for verifying proper uplink of P25 equipment.

In view of the above, there is a continuing, ongoing need for improved systems and methods.

DETAILED DESCRIPTION

Figure 1:
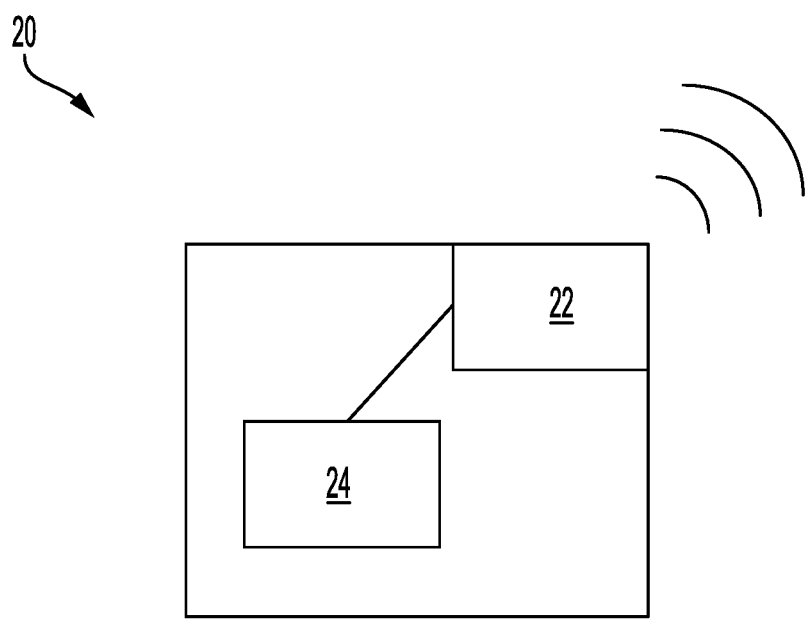
FIG. 1 is a diagram of a user device in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for calculating an SINR measurement and/or an FBER measurement for a P25 H-CPM uplink waveform to determine whether P25 user equipment has been successfully deployed. For example, in some embodiments, the SINR measurement can range from approximately −3 dB to approximately 40 dB, and in some embodiments, the FBER measurement can range from 0 to approximately 50%. In these embodiments, when systems and methods disclosed herein calculate the SINR measurement to be above approximately 10 dB and/or the FBER measurement to be below approximately 5%, systems and methods disclosed herein can determine that the user equipment has been successfully deployed. However, when systems and methods disclosed herein calculate the SINR measurement to be below approximately 10 dB and/or the FBER measurement to be above approximately 5%, systems and methods disclosed herein can determine that the user equipment has been unsuccessfully deployed.

As seen in FIG. 1, in some embodiments, the P25 user equipment 20 can include a wireless communication interface 22 that can receive the P25 H-CPM uplink waveform and a processor 24 coupled to the wireless communication interface 22 that can process the P25 H-CPM uplink waveform and calculate the SINR measurement and/or the FBER measurement. In some embodiments, the processor 24 can include executable control software as would be understood by one of ordinary skill in the art. Furthermore, in some embodiments, the executable control software can be stored on a transitory or non-transitory computer readable medium, including, but not limited to local computer memory, RAM, optical storage media, magnetic storage media, flash memory, and the like, and some or all of the processor 24 and the executable control software can execute and control at least some of the methods described herein.

Figure 2:
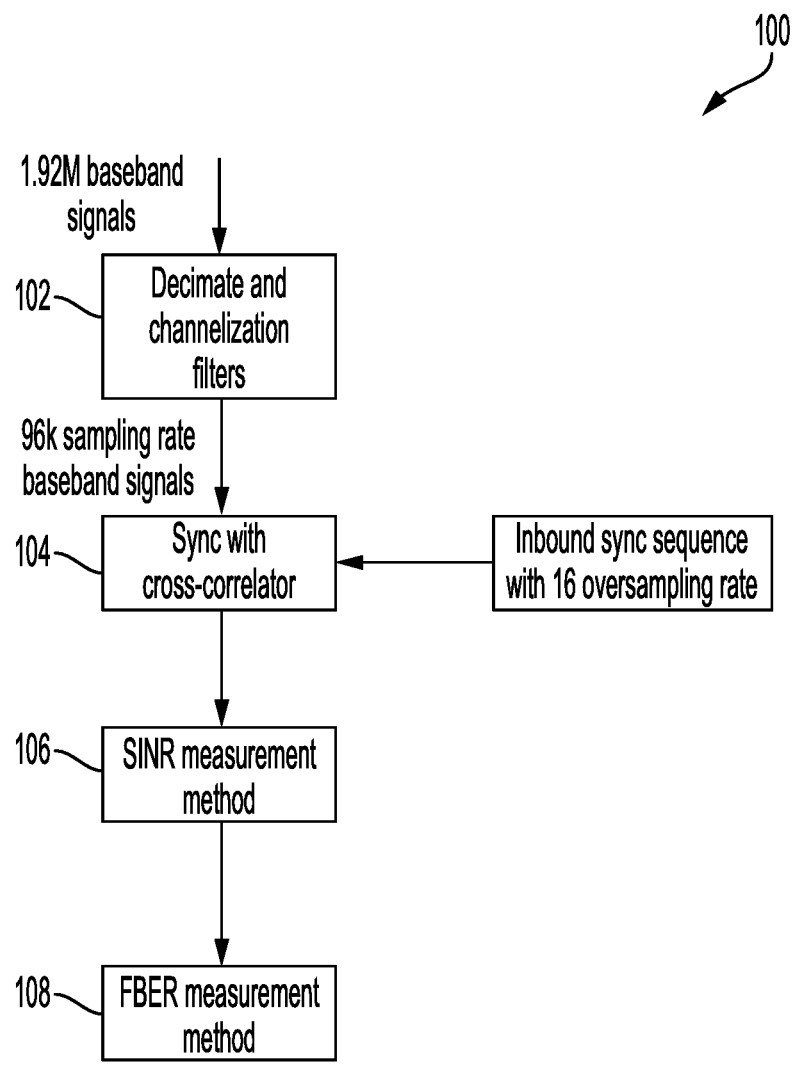
FIG. 2 is a flow diagram of a method in accordance with disclosed embodiments.

FIG. 2 is a flow diagram of a method 100 in accordance with disclosed embodiments. As seen in FIG. 2, the method 100 can include the wireless communication interface 22 receiving the P25 H-CPM uplink waveform and the processor 24 decimating, channel filtering, and/or sampling, at a sampling rate, the P25 H-CPM uplink waveform to identify a first plurality of samples, as in 102. In some embodiments, the P25 H-CPM uplink waveform can include a 1.92 MHz baseband signal, and in some embodiments, the sampling rate can be approximately 96 kHz.

Figure 3:
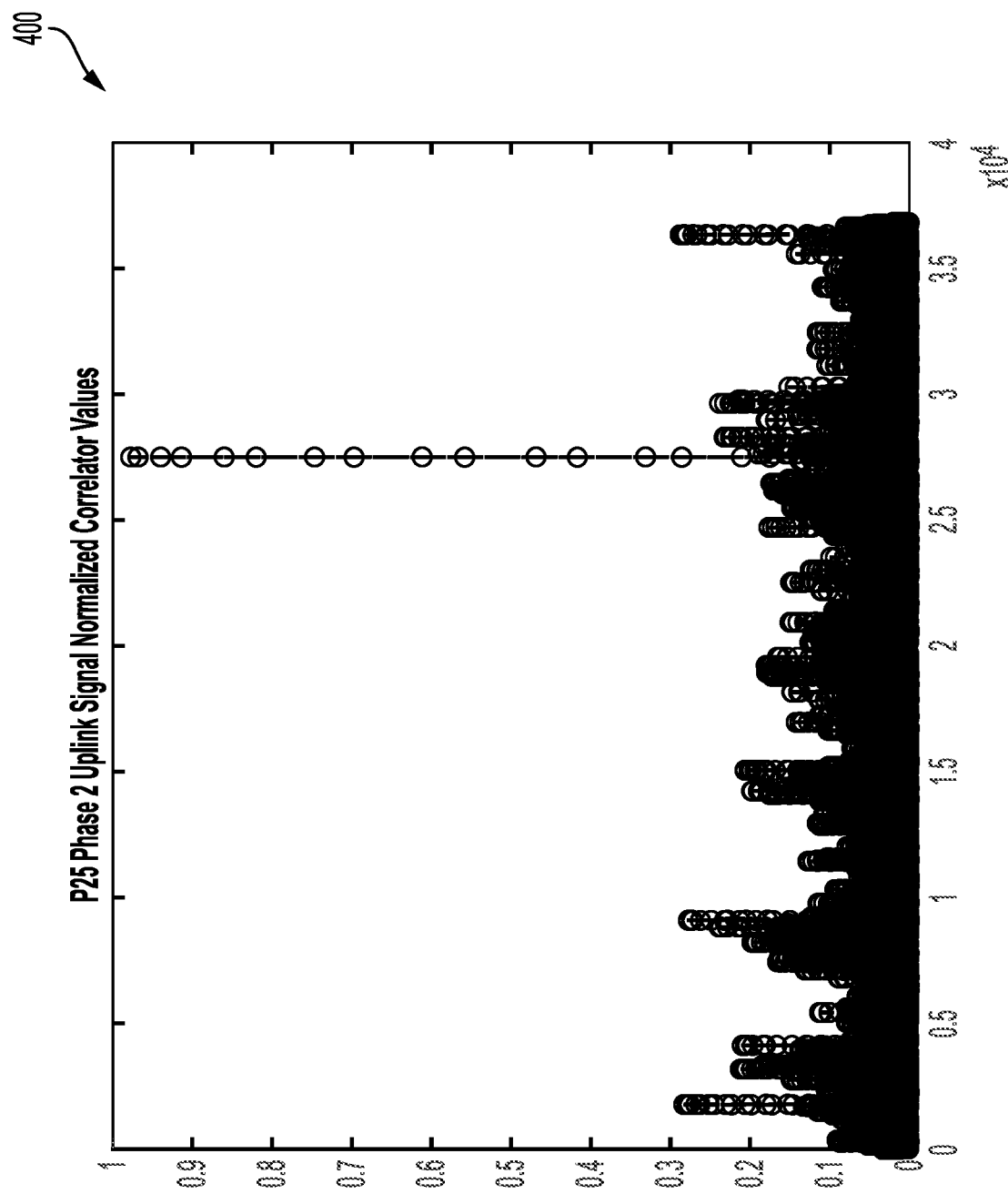
FIG. 3 is a graph illustrating exemplary cross-correlation results of oversampled frames of a wireless signal in accordance with disclosed embodiments.

In some embodiments, the method 100 can also include the processor 24 cross-correlating the first plurality of samples with a set of known synchronization samples to identify a signal sample time synchronization for the P25 H-CPM uplink waveform, as in 104. In this regard, FIG. 3 is a graph 400 illustrating exemplary cross-correlation results for a 22-symbol inbound synchronization sequence with an oversampling rate of 16 and a test signal length of 390 ms. As seen in FIG. 3, the graph 400 can include a single peak output representing cross-correlation output with respect to the P25 H-CPM uplink waveform. In some embodiments, the set of known synchronization samples used by the processor 24 can include an oversampled version of an inbound sync sequence that presents at a start of an inbound burst of the P25 H-CPM uplink waveform, and in some embodiments, the inbound sync sequence can have the sampling rate used to identify the first plurality of samples.

In some embodiments, after obtaining the signal sample time synchronization, the processor 24 can calculate received signal statistic information for pre-defined $KL_o$ samples. For example, in some embodiments, the received signal statistic information can include a column vector (y) that is calculated as follows:

$$y=[y_0 \ldots y_{L_o-1}, y_{L_o}, y_{L_o+1}, \ldots, y_{2L_o-1}, \ldots, y_{(K-1)L_o}, y_{(K-1)L_o+1} \ldots y_{KL_o-1}]^T$$

Referring again to FIG. 2, after cross-correlating the first plurality of samples with the set of known synchronization samples to identify the signal sample time synchronization for the P25 H-CPM uplink waveform, as in 104, the method 100 can include the processor 24 calculating the SINR measurement, as in 106, and/or calculating the FBER measurement, as in 108.

Figure 6:
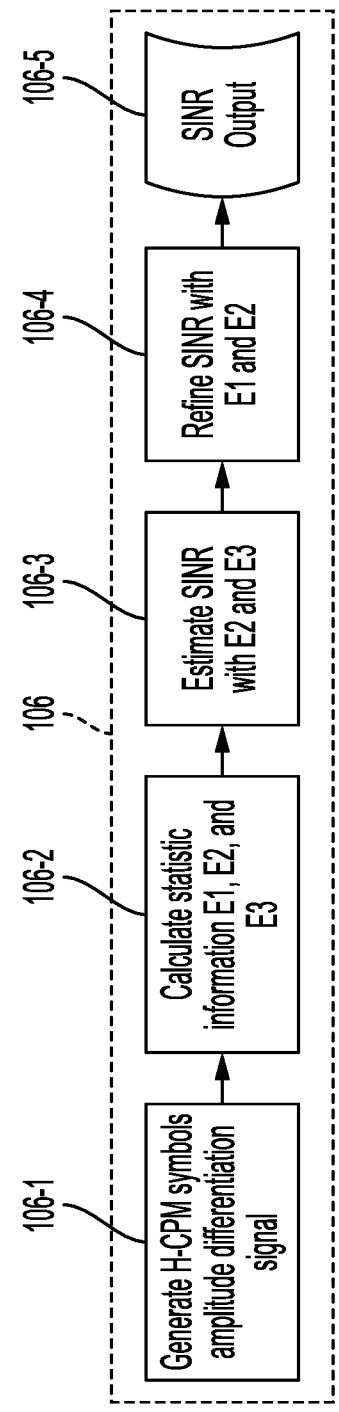
FIG. 6 is a flow diagram of a method in accordance with disclosed embodiments.

In some embodiments, calculating the SINR measurement for the P25 H-CPM uplink waveform as in 106 of FIG. 2 can include the processor 24 using the first plurality of samples and the signal sample time synchronization identified from the cross-correlation output to calculate the SINR measurement. For example, as seen in FIG. 6, in some embodiments, the processor 24 can use the first plurality of samples and the signal sample time synchronization to generate an amplitude differentiation signal ($v_2$) for the P25 H-CPM uplink waveform, as in 106-1. Advantageously, using the amplitude differentiation signal ($v_2$) to calculate the SINR measurement can help mitigate field signal fluctuations.

After generating the amplitude differential signal ($v_2$), the processor 24 can calculate a first order envelop mean value ($E_1$) for the amplitude differentiation signal ($v_2$), calculate a second order envelop mean value ($E_2$) for the amplitude differentiation signal ($v_2$), and calculate a fourth order envelop mean value ($E_3$) for the amplitude differentiation signal ($v_2$), as in 106-2. Finally, the processor 24 can use the fourth order envelop mean value ($E_3$) and the second order envelop mean ($E_2$) value to estimate initial power and initial noise components of the SINR measurement, as in 106-3, use the first order envelop mean value ($E_1$) and the second order envelop mean value ($E_2$) to refine the SINR measurement, as in 106-4, and output the SINR measurement, as in 106-5.

In some embodiments, the processor 24 can calculate the first order envelop mean value ($E_1$) as follows:

$$E_1 \triangleq E[|v_2|] = \sqrt{N\pi/2} \exp\left(-\frac{S}{2N}\right)\left[\left(1+\frac{S}{N}\right)I_0\left(\frac{S}{2N}\right) + \frac{S}{N}I_1\left(\frac{S}{2N}\right)\right]$$

where S is a true signal power, N is a true noise power, $I_0(\bullet)$ is a Bessel function of the first kind with order 0, and $I_1(\bullet)$ is a Bessel function of the first kind with order 1.

Additionally or alternatively, in some embodiments, the processor 24 can calculate the second order envelop mean value ($E_2$) as follows:

$$E_2 \triangleq E[(v_2^H v_2)] = S+N$$

where $(\bullet)^H$ represents a Hermitian transpose operator.

Additionally or alternatively, in some embodiments, the processor 24 can calculate the fourth order envelop mean value ($E_3$) as follows:

$$E_3 \triangleq E[(v_2^H v_2)^2] = S^2 + 4SN + 2N^2.$$

In some embodiments, the processor 24 can calculate the amplitude differentiation signal ($v_2$) by calculating a differential envelop vector $v_1$, dividing $v_1$ by 2 to compensate for a noise amplitude doubling, and adding back in a mean amplitude $E(|y|)$ as follows:

$$v_2 = \frac{v_1}{2} + E(|y|)$$

where y is a column vector of the P25 H-CPM uplink waveform and $v_1$ is the differential envelope vector for an envelope difference of the P25 H-CPM uplink waveform at a sample distance of 1 symbol or an oversample of $L_o$ number of samples per symbol. In particular, $|y|$ and $v_1$ can be calculated as follows:

$$|y|=[|y_0||y_1| \ldots |y_{L_o-1}|,|y_{L_o}||y_{L_o+1}| \ldots |y_{L_o-1}|,\ldots,|y_{(K-1)L_o}||y_{(K-1)L_o+1}| \ldots |y(KL_o-1)|]$$

$$v_1=[|y_0||y_1| \ldots |y_{(K-1)L_o-1}|]-[|y_{L_o}||y_{L_o+1}| \ldots |y_{KL_o-1}|]$$

Figure 5:
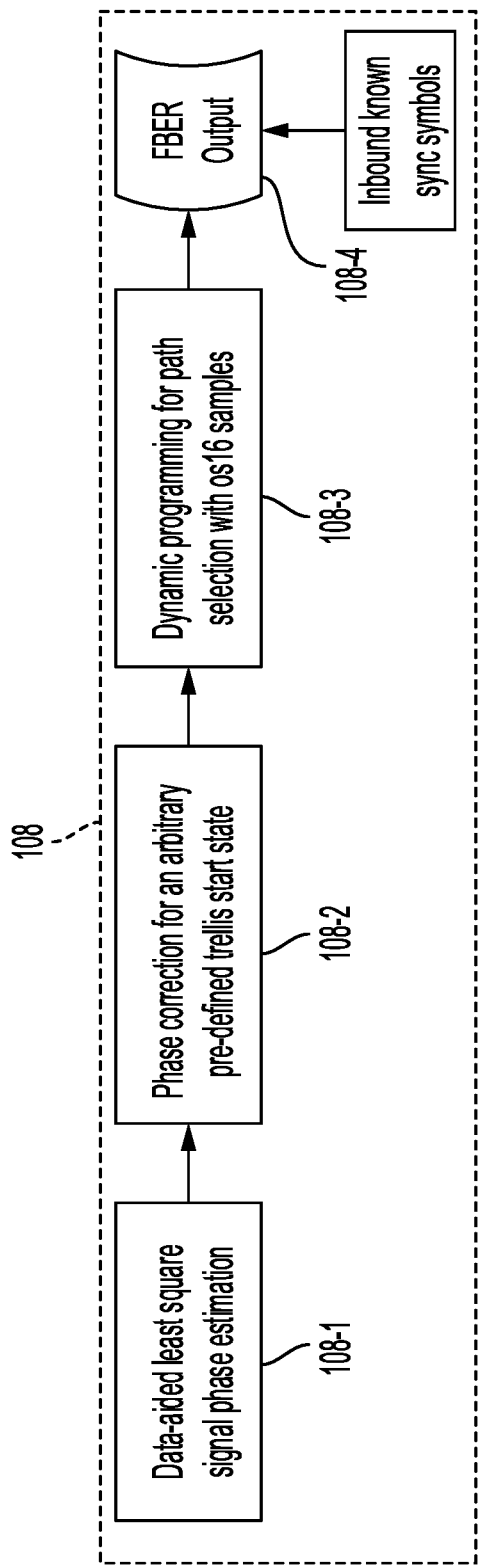
FIG. 5 is a flow diagram of a method in accordance with disclosed embodiments.

As explained above, the processor 24 can also calculate the FBER measurement for the P25 H-CPM uplink waveform, as in 108 of FIG. 2. For example, as seen in FIG. 5, in some embodiments, calculating the FBER measurement can include the processor 24 calculating a phase angle ($\hat{\theta}_0$) for the P25 H-CPM uplink waveform, as in 108-1. In some embodiments, the processor 24 can use a data aided least squares estimator to calculate the phase angle ($\hat{\theta}_0$) as follows:

$$\hat{\theta}_0 = \text{angle}((y^H y)(y^H x))$$

where y is a signal vector of the P25 H-CPM uplink waveform, x is the set of known synchronization samples of the P25 H-CPM uplink waveform, and $(\bullet)^H$ represents a Hermitian transpose operator.

After calculating the phase angle ($\hat{\theta}_0$), the processor 24 can use the phase angle to phase correct or rectify the P25 H-CPM uplink waveform to match a pre-defined start or initial state of a state transition diagram, as in 108-2. Then, the processor 24 can use the state transition diagram and the P25 H-CPM uplink waveform as rectified to generate a second plurality of samples that correspond to a plurality of possible paths through the state transition diagram, use the first plurality of samples and the second plurality of samples to select one of the plurality of possible paths through the state transition diagram as a demodulation path for real time signal processing, and demodulate the P25 H-CPM uplink waveform by iterating the P25 H-CPM uplink waveform through the demodulation path, as in 108-3. For example, in some embodiments, the processor 24 can compare the second plurality of samples to the first plurality of samples to calculate a Euclidean distance therebetween for each state transition of the state transition diagram at which multiple ones of the plurality of possible paths through the state transition diagram converge to a single state and select the one of the plurality of possible paths as an identified path for which a summation of the Euclidean distance is smallest. Additionally or alternatively, in some embodiments, the processor 24 can identify the one of the plurality of possible paths through the state transition diagram as an identified path for which the SINR measurement indicates a maximum accumulated bits soft information probability.

Finally, the processor can calculate the FBER measurement by comparing the P25 H-CPM uplink waveform as demodulated to a set of known synchronization symbols, as in 108-4. For example, in some embodiments, the set of known synchronization symbols can be derived by decimating the set of known synchronization samples retrieved from the inbound sync sequence. Furthermore, in some embodiments, a starting location of demodulated synchronization symbols of the P25 H-CPM uplink waveform as demodulated can be identified by using the cross-correlation output to identify a signal start time index.

In some embodiments, the state transition diagram can include a trellis diagram based on a symbol convolution-based modulation of the P25 H-CPM uplink waveform. For example, in these embodiments, the P25 H-CPM uplink waveform can be represented as follows:

$$y(nT_s) = \sqrt{S} \exp(i2\pi f_\Delta nT_s) \exp\left(i2\pi h \sum_{k \leq n} I_k \int_0^{nT_s - kT_s} g(\tau) d\tau\right) + \sqrt{N} z(nT_s)$$

where $y(nT_s)$ is a received H-CPM signal sample at an n-th sampling time instant, $T_s$ is a sampling period, $z(nT_s)$ is additive white Gaussian noise (AWGN) at the n-th sampling time instant following a standard normal distribution, $f_\Delta$ is a frequency offset error or frequency offset residual error between the P25 user equipment 20 and a transmitter or a receiver, h is the modulation index, $I_k(\bullet)$ is the sequence of information symbols sent at transmitter side, S the desired H-CPM signal power, N is the desired H-CPM noise power, and g(t) is a frequency impulse response defined as follows:

$$g(t) = \begin{cases} \frac{1}{G}\left[\mathrm{sinc}\left(\frac{\lambda}{T_s}\left(t - \frac{LT_s}{2}\right)\right)\right]\cos^2\left(\frac{\pi}{LT_s}\left(t - \frac{LT_s}{2}\right)\right) & \text{for } t \in [0, LT_sL_o] \\ 0, & \text{otherwise} \end{cases}$$

where sin $c(t)=\sin(\pi t)/(\pi t)$, L is pulse response length in symbols, and $$L_o = \frac{T_{sym}}{T_s}$$

is an oversampling rate. In some embodiments, for P25 Phase 2 standard uplink transmissions, $$\lambda = \frac{3}{4}, h = \frac{1}{3}, L = 4,$$

and G can be a normalization factor for $G=4.3455 \times 10^{-4}$.

In embodiments in which the state transition diagram includes a trellis diagram, the processor 24 can build the trellis diagram for use in calculating the FBER measurement according to modulated samples output from setting $q(nT_s) = \int_0^{nT_s} g(\tau)d\tau$ such that $2\pi h \Sigma_{k \leq n} I_k \int_0^{nT_s - kT_s} g(\tau)d\tau = 2\pi h \Sigma_{k \leq n} I_k q(t - kT_s) = \pi h \Sigma_{k \leq n-L} I_k + 2\pi h \Sigma_{n-L+1 \leq k \leq n} I_k q(t-kT_s), nT_s \leq t \leq (n+1)T_s$ and defining $\theta_n = \eta h \Sigma_{k \leq n-L} I_k$ and $S_n = \{\theta_n, I_{n-1}, I_{n-2}, \ldots, I_{n-L+1}\}$.

Figure 4:
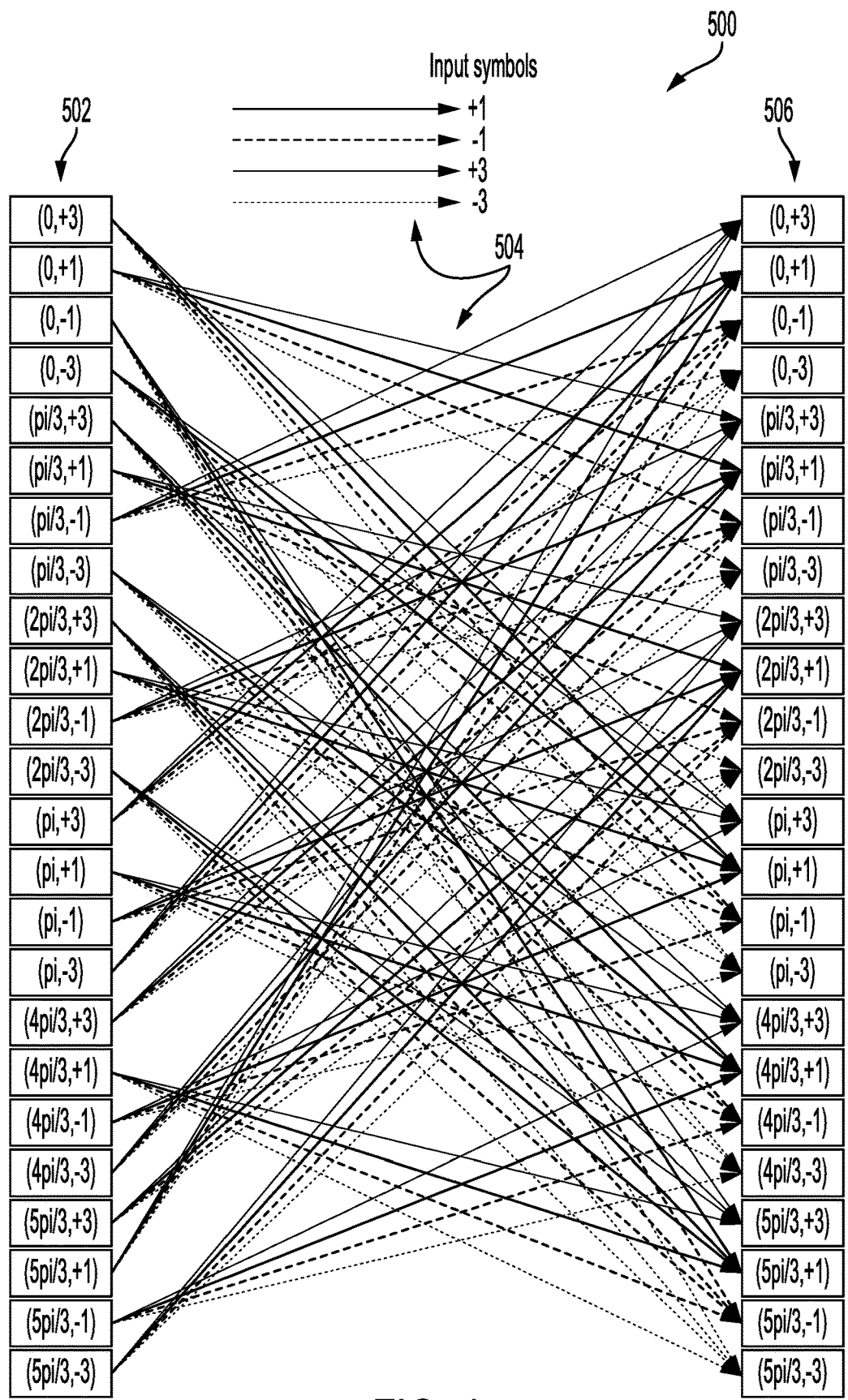
FIG. 4 is an exemplary state transition diagram in accordance with disclosed embodiments.

FIG. 4 is an exemplary state transition diagram 500 in accordance with disclosed embodiments. In particular, for the trellis diagram 500, h=1/3, M=4, and L=2, which can be extended for all 384 states of the P25 H-CPM uplink waveform. As seen in FIG. 4, in some embodiments, the trellis diagram 500 can include an initial state 502, the plurality of possible paths 504, and a final state 506 that includes the second plurality of samples. In some embodiments, the initial state 502 for the trellis diagram 500 can be arbitrarily set so as to reduce the amount of needed hardware resources.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   sampling, at a sampling rate, a Project 25 (P25) Harmonized-Continuous Phase Modulation (H-CPM) uplink waveform received by P25 user equipment to identify a first plurality of samples;
   correlating the first plurality of samples with a set of known synchronization samples to identify a signal sample time synchronization for the P25 H-CPM uplink waveform and cross-correlation output;
   calculating a phase angle for the P25 H-CPM uplink waveform;
   using the phase angle to rectify the P25 H-CPM uplink waveform to match a pre-defined start state of a state transition diagram;
   using the state transition diagram and the P25 H-CPM uplink waveform as rectified to generate a second plurality of samples, wherein the second plurality of samples corresponds to a plurality of possible paths through the state transition diagram;
   using the first plurality of samples and the second plurality of samples to select one of the plurality of possible paths through the state transition diagram as a demodulation path;
   iterating the P25 H-CPM uplink waveform through the demodulation path to demodulate the P25 H-CPM uplink waveform;
   using the cross-correlation output to compare the P25 H-CPM uplink waveform as demodulated to a set of known synchronization symbols to calculate a frame bit error rate (FBER) measurement; and
   using the FBER measurement to determine whether the P25 user equipment was successfully deployed.

2. The method of claim 1 further comprising:
   comparing the second plurality of samples to the first plurality of samples to calculate a Euclidean distance therebetween for each state transition of the state transition diagram at which multiple ones of the plurality of possible paths through the state transition diagram converge to a single state; and
   selecting the one of the plurality of possible paths through the state transition diagram as an identified path for which a summation of the Euclidean distance is smallest.

3. The method of claim 1 wherein the state transition diagram includes a trellis diagram based on a symbol convolution-based modulation.

4. The method of claim 3 wherein the phase angle ($\hat{\theta}_0$) is calculated using a data aided least squares estimator as follows:

$$\hat{\theta}_0 = \text{angle}((y^H y)(y^H x))$$

where y is a signal vector of the P25 H-CPM uplink waveform, x is a set of known synchronization samples of the P25 H-CPM uplink waveform, and $(\bullet)^H$ represents a Hermitian transpose operator.

5. The method of claim 1 further comprising:
using the first plurality of samples and the signal sample time synchronization to calculate a signal-to-interference-plus-noise ratio (SINR) measurement for the P25 H-CPM uplink waveform;
selecting the one of the plurality of possible paths through the state transition diagram as an identified path for which the SINR measurement indicates a maximum accumulated bits soft information probability; and
using the SINR measurement to determine whether the P25 user equipment was successfully deployed.

6. The method of claim 5 further comprising:
using the first plurality of samples and the signal sample time synchronization to generate an amplitude differentiation signal for the P25 H-CPM uplink waveform;
calculating a first order envelop mean value for the amplitude differentiation signal;
calculating a second order envelop mean value for the amplitude differentiation signal;
calculating a fourth order envelop mean value for the amplitude differentiation signal;
using the fourth order envelop mean value and the second order envelop mean value to estimate the SINK measurement; and
using the first order envelop mean value and the second order envelop mean value to refine the SINR measurement.

7. The method of claim 6 wherein the amplitude differentiation signal ($v_2$) is calculated as follows:

$$v_2 = \frac{v_1}{2} + E(|y|)$$

where y is a column vector of the P25 H-CPM uplink waveform and $v_1$ is a differential envelope vector for an envelope difference of the P25 H-CPM uplink waveform at a sample distance of 1 symbol or an oversample of $L_o$ number of samples per symbol.

8. The method of claim 7 wherein the first order envelop mean value ($E_1$) is calculated as follows:

$$E_1 \triangleq E[|v_2|] = \sqrt{N\pi/2} \exp\left(-\frac{S}{2N}\right)\left[\left(1+\frac{S}{N}\right)I_0\left(\frac{S}{2N}\right) + \frac{S}{N} I_1\left(\frac{S}{2N}\right)\right]$$

where S is a true signal power, N is a true noise power, $I_0(\bullet)$ is a Bessel function of the first kind with order 0, and $I_1(\bullet)$ is a Bessel function of the first kind with order 1.

9. The method of claim 8 wherein the second order envelop mean value ($E_2$) is calculated as follows:

$$E_2 \triangleq E[v_z^H v_z] = S + N$$

where $(\bullet)^H$ represents a Hermitian transpose operator.

10. The method of claim 9 wherein the fourth order envelop mean value ($E_3$) is calculated as follows:

$$E_3 \triangleq E_2[(v_2^H v_2)^2] = S^2 + 4SN + 2N^2.$$

11. A system comprising:
a wireless communication interface of a user device that receives a Project 25 (P25) Harmonized-Continuous Phase Modulation (H-CPM) uplink waveform; and
a processor coupled to the wireless communication interface,
wherein the processor is configured to sample the P25 H-CPM uplink waveform at a sampling rate to identify a first plurality of samples,
wherein the processor is configured to correlate the first plurality of samples with a set of known synchronization samples to identify a signal sample time synchronization for the P25 H-CPM uplink waveform and cross-correlation output,
wherein the processor is configured to calculate a phase angle for the P25 H-CPM uplink waveform,
wherein the processor is configured to use the phase angle to rectify the P25 H-CPM uplink waveform to match a pre-defined start state of a state transition diagram,
wherein the processor is configured to use the state transition diagram and the P25 H-CPM uplink waveform as rectified to generate a second plurality of samples,
wherein the second plurality of samples correspond to a plurality of possible paths through the state transition diagram,
wherein the processor is configured to use the first plurality of samples and the second plurality of samples to select one of the plurality of possible paths through the state transition diagram as a demodulation path,
wherein the processor is configured to iterate the P25 H-CPM uplink waveform through the demodulation path to demodulate the P25 H-CPM uplink waveform,
wherein the processor is configured to use the cross-correlation output to compare the P25 H-CPM uplink waveform as demodulated to a set of known synchronization symbols to calculate a frame bit error rate (FBER) measurement, and
wherein the processor is configured to use the FBER measurement to determine whether the P25 user equipment was successfully deployed.

12. The system of claim 11 wherein the processor is configured to compare the second plurality of samples to the first plurality of samples to calculate a Euclidean distance therebetween for each state transition of the state transition diagram at which multiple ones of the plurality of possible paths through the state transition diagram converge to a single state and select the one of the plurality of possible paths through the state transition diagram as an identified path for which a summation of the Euclidean distance is smallest.

13. The system of claim 11 wherein the state transition diagram includes a trellis diagram based on a symbol convolution-based modulation.

14. The system of claim 13 wherein the processor is configured to calculate the phase angle ($\hat{\theta}_0$) using a data aided least squares estimator as follows:

$$\hat{\theta}_0 = \text{angle}((y^H y)(y^H x))$$

where y is a signal vector of the P25 H-CPM uplink waveform, x is a set of known synchronization samples of the P25 H-CPM uplink waveform, and $(\bullet)^H$ represents a Hermitian transpose operator.

15. The system of claim 11 wherein the processor is configured to use the first plurality of samples and the signal sample time synchronization to calculate a signal-to-interference-plus-noise ratio (SINR) measurement for the P25

H-CPM uplink waveform, select the one of the plurality of possible paths through the state transition diagram as an identified path for which the SINR measurement indicates a maximum accumulated bits soft information probability, and use the SINR measurement to determine whether the P25 user equipment was successfully deployed.

16. The system of claim 15 wherein the processor is configured to use the first plurality of samples and the signal sample time synchronization to generate an amplitude differentiation signal for the P25 H-CPM uplink waveform, calculate a first order envelop mean value for the amplitude differentiation signal, calculate a second order envelop mean value for the amplitude differentiation signal, calculate a fourth order envelop mean value for the amplitude differentiation signal, use the fourth order envelop mean value and the second order envelop mean value to estimate the SINK measurement, and use the first order envelop mean value and the second order envelop mean value to refine the SINR measurement.

17. The system of claim 16 wherein the processor is configured to calculate the amplitude differentiation signal ($v_2$) as follows:

$$v_2 = \frac{v_1}{2} + E(|y|)$$

where y is a column vector of the P25 H-CPM uplink waveform and $v_1$ is a differential envelope vector for an envelope difference of the P25 H-CPM uplink waveform at a sample distance of 1 symbol or an oversample of $L_o$ number of samples per symbol.

18. The system of claim 17 wherein the processor is configured to calculate the first order envelop mean value ($E_1$) as follows:

$$E_1 \triangleq E[|v_2|] = \sqrt{N\pi/2} \exp\left(-\frac{S}{2N}\right)\left[\left(1+\frac{S}{N}\right)I_0\left(\frac{S}{2N}\right)+\frac{S}{N}I_1\left(\frac{S}{2N}\right)\right]$$

where S is a true signal power, N is a true noise power, $I_0(\bullet)$ is a Bessel function of the first kind with order 0, and $I_1(\bullet)$ is a Bessel function of the first kind with order 1.

19. The system of claim 18 wherein the processor is configured to calculate the second order envelop mean value ($E_2$) as follows:

$$E_2 \triangleq E[v_2^H v_2] = S+N$$

where $(\bullet)^H$ represents a Hermitian transpose operator.

20. The system of claim 19 wherein the processor is configured to calculate the fourth order envelop mean value ($E_3$) as follows:

$$E_3 \triangleq E[(v_2^H v_2)^2] = S^2 + 4SN + 2N^2.$$

* * * * *